United States Patent
Ericsson et al.

(10) Patent No.: US 6,952,209 B2
(45) Date of Patent: Oct. 4, 2005

(54) VARIABLE SCALED GRAPHICAL INDICATOR TO DISPLAY DYNAMIC DATA

(75) Inventors: Johan Ericsson, Windsor, CA (US); Dara Sariaslani, Santa Rosa, CA (US); Joyjeet Bhowmik, Santa Rosa, CA (US); Joel Dunsmore, Sebastopol, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 613 days.

(21) Appl. No.: 09/894,251

(22) Filed: Jun. 27, 2001

(65) Prior Publication Data

US 2003/0006987 A1 Jan. 9, 2003

(51) Int. Cl.[7] .............................................. G06T 11/20
(52) U.S. Cl. ..................... 345/440; 345/440.2
(58) Field of Search ................................ 345/440–443, 345/772; 702/22, 30, 32

(56) References Cited

U.S. PATENT DOCUMENTS

| | | | | |
|---|---|---|---|---|
| 4,675,147 A | * | 6/1987 | Schaefer et al. ............ | 345/440 |
| 5,483,446 A | * | 1/1996 | Momose et al. ............... | 701/1 |
| 5,893,072 A | * | 4/1999 | Zizzamia ....................... | 705/4 |
| 5,930,369 A | * | 7/1999 | Cox et al. ..................... | 380/54 |
| 6,564,153 B2 | * | 5/2003 | Braun et al. .................. | 702/22 |
| 6,670,972 B2 | * | 12/2003 | Grieve et al. ............... | 345/772 |
| 6,674,185 B2 | * | 1/2004 | Mizuta ........................ | 307/651 |

* cited by examiner

Primary Examiner—Matthew Luu

(57) ABSTRACT

A graphical indicator to assist a user in adjusting the value of a parameter to a target value. The graphical indicator has target value indicia that represents a target value of the parameter, and measured value indicia that represents a measured value of the parameter. A change in a measured value of the parameter relative to the target value is represented by a first corresponding amount of movement of the measured value indicia relative to the target value indicia when the measured value is within a first span of parameter values, and a second, different corresponding amount of movement of the measured value indicia relative to the target value indicia when the measured value is within a second span of parameter values. The graphical indicator provides increased sensitivity to changes in the measured value of the parameter as the measured value becomes closer to the target value of the parameter.

26 Claims, 3 Drawing Sheets

VARIABLE SCALED GRAPHICAL INDICATOR TO DISPLAY DYNAMIC DATA

BACKGROUND OF THE INVENTION

1. Technical Field of the Invention

The present invention relates generally to the measurement field; and, more particularly, to a graphical indicator to facilitate adjusting the value of a parameter.

2. Description of Related Art

Many measurement applications require that the value of a parameter be adjusted from an initial value to a target value. Frequently, the adjustment process involves manipulating a physical or logical adjustment mechanism. For example, if the parameter is frequency, the adjustment process might involve turning a dial to change the frequency Similarly, if the parameter is signal strength, the adjustment process might require moving an antenna associated with a receiver to properly point toward a transmitter.

In many applications, the adjustment process is a multi-step adjustment process. More specifically, a value of the parameter is measured. If the measured value is different than the target value, the adjustment mechanism is manipulated to adjust the value of the parameter; and the adjusted value of the parameter is measured. If the adjusted value of the parameter is still different than the target value, the adjustment mechanism is again manipulated to further adjust the value of the parameter; and the new adjusted value of the parameter is measured. The process is repeated until the measured value of the parameter is the same as the target value.

A multi-step adjustment process as described above can be inconvenient and time-consuming as it may require the adjustment mechanism to be manipulated several times until the measured value of the parameter is the same as the target value.

In a multi-step adjustment process, an indicator is often utilized as a guidance tool to help a user home in on the target value. Depending on the parameter being adjusted, the indicator might be a meter, a thermometer, an audio signal generator, or another device that is capable of advising the user of the measured value of the parameter each time that it is adjusted. The indicator, in effect, provides feedback to the user as the value of the parameter is adjusted so that the user will know if the measured value of the parameter is approaching the target value and when the measured value reaches the target value.

Measurement software have also been developed to display a graphical indicator on a computer screen or other display device. Examples of graphical indicators include fill bars, color alarms and displays of various gauges. Such graphical indicators may include measurement span indicia that represents a span of parameter values capable of being represented by the indicator, target value indicia that represents the target value of the parameter, and measured value indicia that represents the most recent measured value of the parameter. As the value of the parameter is adjusted to approach the target value, the measured value indicia of the graphical indicator correspondingly moves to approach the target value indicia; and by viewing the graphical indicator, a user is provided with information regarding any further adjustment that may be required to reach the target value.

Known graphical indicators may comprise some combination of linear scale, logarithmic scale, graduated semi-circular scale, or the like; however, these options do not provide the user with a level of understanding of the relative separation between a measured value of a parameter and the target value that is needed for efficient manipulation of the adjustment mechanism. Specifically, in known graphical indicators, the sensitivity of the indicator is substantially the same throughout the measurement span of the indicator. This means that an amount of change in the measured value of the parameter is represented by a corresponding amount of movement of the measured value indicia that remains the same throughout the measurement span. In other words, the correspondence between the amount by which the measured value of the parameter changes and the amount of movement of the measured value indicia is linear throughout the measurement span. This linear correspondence throughout the measurement span makes it more difficult for a user to accurately adjust the value of the parameter to the target value, particularly when the measured value is near the target value, as the graphical indicator is simply not sufficiently precise to clearly indicate the amount of adjustment required to achieve the target value. Although the precision of the graphical indicator can be improved by increasing the scale of the indicator, this may result in the measurement span indicia being too large to properly fit within the display or it may require that the span of parameter values represented by the measurement span indicia be reduced.

In addition, in many measurement applications, the target value of a parameter may be a range of acceptable values rather than a single, discrete value; and known graphical indicators lack the capability of properly specifying and identifying a range of acceptable values.

In general, known graphical indicators are not fully effective in guiding a user in manipulating an adjustment mechanism so as to adjust the value of a parameter to a target value in an efficient manner.

SUMMARY OF THE INVENTION

The present invention provides a graphical indicator to assist a user in adjusting the value of a parameter to a target value.

A graphical indicator according to the present invention may comprise target value indicia that represents a target value of the parameter, and measured value indicia that represents a measured value of the parameter. A change in a measured value of the parameter relative to the target value is represented by a first corresponding amount of movement of the measured value indicia relative to the target value indicia when the measured value is within a first span of parameter values, and a second corresponding amount of movement of the measured value indicia relative to the target value indicia when the measured value is within a second span of parameter values, the second corresponding amount of movement being different than the first corresponding amount of movement.

According to an embodiment of the invention, the graphical indicator further includes measurement span indicia that represents a span of parameter values capable of being represented by the graphical indicator, and the measurement span indicia includes a first measurement span indicia portion in which an amount of change in a measured value of the parameter relative to the target value is represented by the first corresponding amount of movement of the measured value indicia relative to the target value indicia, and a second measurement span indicia portion in which the amount of change in a measured value of the parameter relative to the target value is represented by the second corresponding amount of movement of the measured value indicia relative to the target value indicia.

According to an embodiment of the present invention, the first measurement span indicia portion is closer to the target value indicia than the second measurement span indicia portion, and the first corresponding amount of movement is greater than the second corresponding amount of movement. Accordingly, in the first measurement span indicia portion, the graphical indicator is more sensitive to changes in the measured value of the parameter than in the second measurement span indicia portion.

The present invention recognizes that a user is generally not particularly interested in the actual value of the parameter as it is being adjusted, but is primarily interested in the value of the parameter relative to the target value. Therefore, it is not important that the graphical display represent actual parameter values. The present invention also recognizes that when the measured value of a parameter differs significantly from the target value, adjustments of the parameter value are rather large and imprecise, and it is not necessary for the graphical indicator to represent the large changes with precision. On the other hand, when the measured value of the parameter is close to the target value, only small adjustments of the parameter value are needed to reach the target value; and the graphical indicator should represent these small changes with greater precision so as to better assist the user in properly adjusting the value of the parameter and to reach the target value in as few steps as possible.

According to a further embodiment of the invention, the first measurement span indicia portion comprises a linear measurement span indicia portion in which the first corresponding amount of movement is the same throughout the first measurement span indicia portion; and the second measurement span indicia portion comprises a non-linear measurement span indicia portion in which the second corresponding amount of movement differs at different locations in the non-linear measurement span indicia portion. In particular, in the second measurement span indicia portion, the second corresponding amount of movement decreases as a function of the extent by which the measured value of the parameter differs from the target value of the parameter such that the greater the difference between the measured value of the parameter and the target value, the less the sensitivity of the graphical indicator within the non-linear measurement span indicia portion.

According to a further embodiment of the invention, the non-linear measurement span indicia portion comprises a plurality of segments in which an amount of change in the measured value of the parameter is represented by increasingly lesser amounts of corresponding movement of the measured value indicia as the span of measured values represented by the segments differ to a greater extent from the target value. The correspondence between the amount of change of the measured value of the parameter and the amount of movement of the measured value indicia may be linear in each segment; however, the correspondence in the non-linear measurement span indicia portion as a whole is non-linear.

Yet further advantages, features and embodiments of the present invention will become apparent hereinafter in conjunction with the following detailed description of exemplary embodiments of the invention.

DETAILED DESCRIPTION OF THE EXEMPLARY EMBODIMENTS OF THE INVENTION

Figure 1:
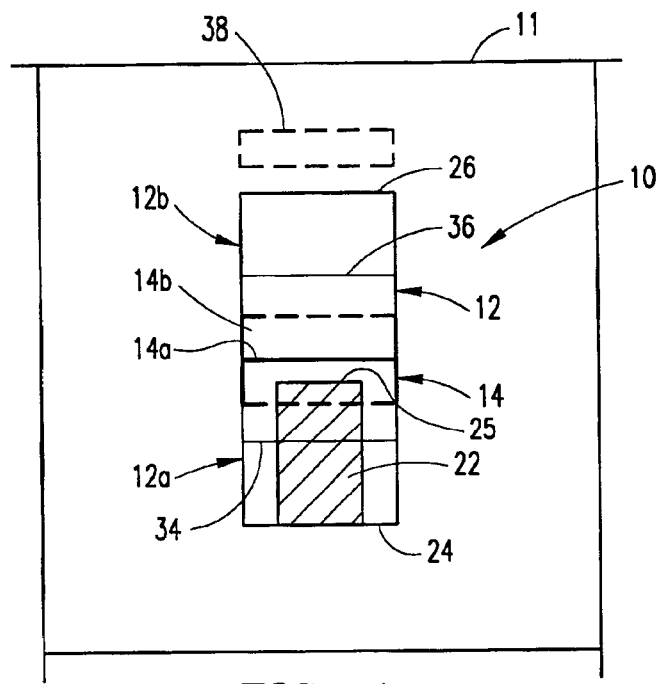
FIG. 1 schematically illustrates a graphical indicator according to an embodiment of the present invention.

FIG. 1 schematically illustrates a graphical indicator according to an exemplary embodiment of the present invention. The graphical indicator is generally designated by reference number 10, and comprises a display on a computer screen 11 or on another display device.

Graphical indicator 10 includes measurement span indicia 12 that represents a span of parameter values capable of being represented by the graphical indicator. Thus, when a measured value of a parameter is within the span of parameter values represented by indicia 12, the value will be represented by the graphical indicator 10; whereas when the measured value of the parameter is outside the span, the value will not be represented by the indicator.

In FIG. 1, measurement span indicia 12 comprises an elongated, rectangular-shaped area oriented vertically on screen 11. It should be understood, however, that this is intended to be exemplary only as the measurement span indicia can take other forms; for example, a horizontally-oriented, rectangular-shaped area or a vertical or horizontal line, without departing from the scope of the present invention. The indicia 12 can be set by a user to represent a desired span of parameter values.

A target value indicia 14 is located within measurement span indicia 12. Target value indicia 14 represents a target value of the parameter. The target value can be a discrete value, represented by a horizontal line 14a, or it can be a range of acceptable values, represented by region 14b. In exemplary embodiments of the invention, either or both representations 14a and 14b may be included in the graphical indicator 10. The region 14b, in particular, can be represented as a colored region in the measurement span indicia, or it can be represented in some other convenient manner.

The target value of the parameter represented by the target value indicia can be set by the user to a desired value, and the target value indicia is usually positioned in the center of the measurement span indicia. The target value indicia thus divides the measurement span indicia into first and second measurement span indicia sections 12a and 12b that represent ranges of parameter values that are less than or more than the target value, respectively. Thus, in accordance with the embodiment of FIG. 1, and as will be explained hereinafter, a value of the parameter can be adjusted to the target value from measured values that are either less than or more than the target value.

A measured value indicia 22 is also located within the measurement span indicia 12 of the graphical indicator. Measured value indicia 22 represents a measured value of the parameter. In FIG. 1, indicia 22 comprises a vertical bar that extends upwardly from the lower end 24 of the measurement span indicia to a location 25 that represents the most recent measured value of the parameter. Thus, if the measured value of the parameter changes, indicia 22 becomes longer or shorter, and the location 25 thereof moves closer to or farther away from the target value indicia. In FIG. 1, the upper edge 25 of bar 22 is within the target value indicia 14b indicating that the measured value of the parameter is at an acceptable value In an exemplary embodiment of the present invention, measured value indicia 22 is of a first color assigned by the user. When the measured value of the parameter is equal to the target value (either equal to the discrete target value 14a or within the target region 14b) the measured value indicia changes to a second color to clearly indicate to the user that the measured value of the parameter is the same as the target value.

In FIG. 1 also, measured value indicia 22 is within first measurement span indicia section 12a and thus represents a parameter value that was adjusted to the target value from a value less than the target value. If the value of the parameter is adjusted to the target value from a value more than the target value, indicia 22 will extend from the upper end 26 of the second measurement span indicia section 12b downwardly to a position representing the most recent measured value of the parameter.

As also illustrated in FIG. 1, graphical indicator 10 further includes a pair of horizontal lines 34 and 36, below and above the target value indicia, respectively. As will be explained hereinafter, lines 34 and 36 demarcate boundaries between linear and non-linear regions of measurement span indicia 12. In addition, a space 38 may be reserved on the graphical indicator for a suitable legend to identify the parameter or for another purpose.

As described previously, the present invention is particularly useful in measurement applications in which the value of a parameter is adjusted to be equal to a target value by a multi-step adjustment process that involves the manipulation of an adjustment mechanism. The adjustment mechanism can be a physical adjustment mechanism such as a knob or a lever, or it can be a logical adjustment mechanism. The parameter can be any parameter the value of which is capable of being adjusted. For example, as mentioned previously, the parameter might be signal frequency, and the adjustment mechanism might be a mechanism for adjusting the frequency to a target frequency, i.e., to tune a device such as a radio receiver or a resonator on a bandpass filter. Alternatively, the parameter might be signal strength and the adjustment mechanism might be a mechanism for moving an antenna in a receiver to point to a signal transmitter to maximize the strength of a received signal. The parameter can also be temperature, length, humidity and essentially any other adjustable parameter; and it is not intended to limit the invention to any particular parameter.

Figure 2:
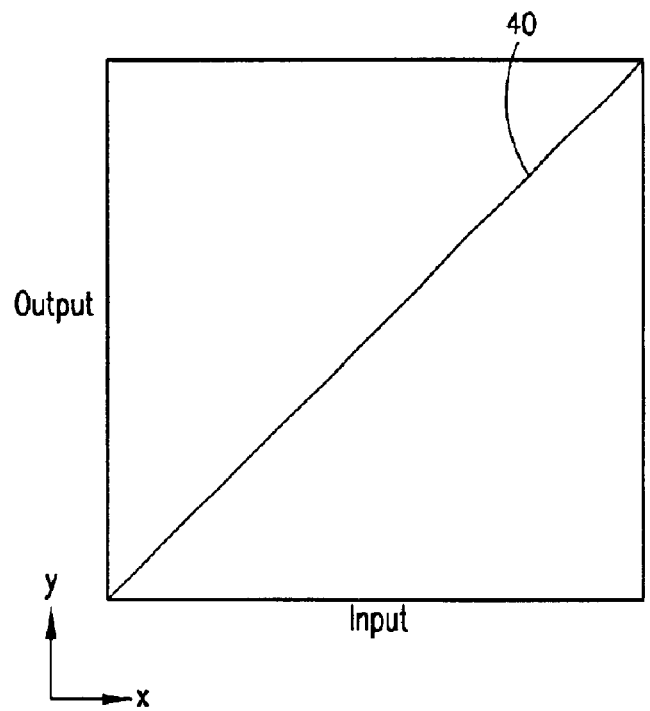
FIG. 2 is a graph that schematically illustrates the operation of a known graphical indicator to assist in explaining the present invention.

FIG. 2 is a graph that illustrates the operation of a known graphical display to assist in explaining the present invention. In FIG. 2, the x-axis represents values of a parameter that are capable of being represented within the measurement span of a graphical indicator (designated as "Input" values); and the y-axis represents positions of the measured value indicia within the measurement span indicia (designated as "Output" values). As indicated by the straight line 40 in FIG. 2, as the value of the parameter changes, the position of the measured value indicia changes in a corresponding, linear manner throughout the measurement span indicia. In other words, at any location throughout the measurement span indicia, an amount of change in the measured value of the parameter will result in the same corresponding amount of movement of the measured value indicia. For example, if the parameter is temperature, and the measured value of the temperature changes by 10 degrees, this amount of change will be represented by the same amount of movement of the measured value indicia whether the change is from 10 degrees to 20 degrees or from 1000 degrees to 1010 degrees. Thus, the level of sensitivity of the graphical indicator is constant, and thus linear, over the entire range of measured values represented by the measurement span indicia.

In a graphical indicator that operates as illustrated in FIG. 2, user alacrity is the same throughout the measurement span. In order to enhance maneuverability of the adjustment mechanism by the user, however, it is desirable that there be increased sensitivity around the target value indicia of the graphical indicator. Specifically, as a measured value approaches the target value, the extent to which the value of the parameter must be further adjusted decreases, and the extent to which the adjustment mechanism must be further manipulated also decreases. A graphical indicator that operates as illustrated in FIG. 2 cannot clearly represent slight changes in the measured value; and is, accordingly, less useful to the user in homing in on the target value as the measured value approaches the target value.

Figure 3:
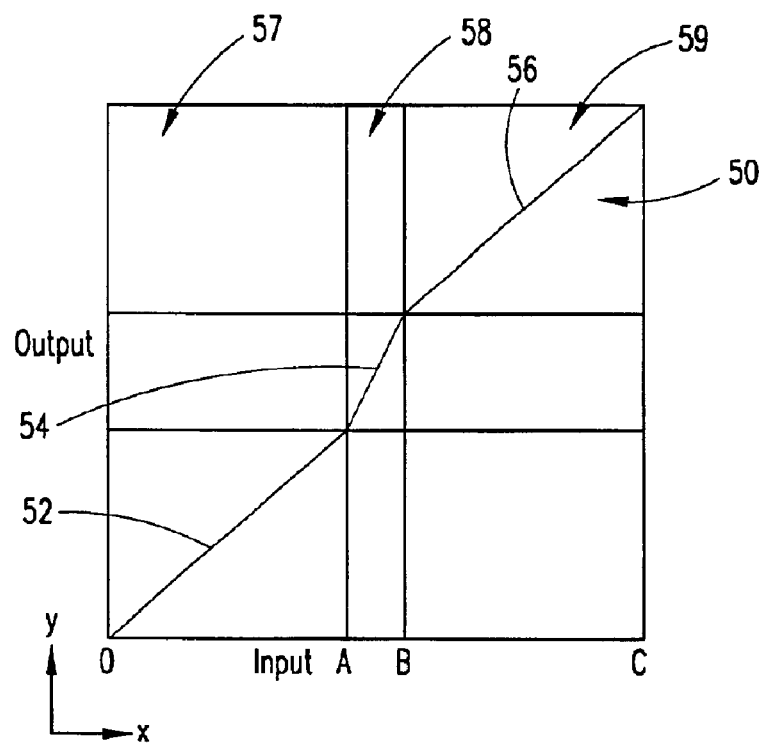
FIG. 3 is a graph that schematically illustrates the operation of a graphical indicator according to an embodiment of the present invention.

FIG. 3 is a graph illustrating the operation of a graphical indicator according to an embodiment of the present invention. As in the graph of FIG. 2, the x-axis also represents values of a parameter that are capable of being represented within the measurement span of the graphical indicator; and the y-axis represents positions of the measured value indicia within the measurement span indicia of the graphical indicator. The line 50 in FIG. 3 includes three portions 52, 54 and 56 which can be represented by the following equations:

$f(x)=ax$ for $0 \leq x < A$ $f(x)=bx+a/b*A$ for $A \leq x < B$ $f(x)=ax-b/a*B$ for $B \leq x \leq C$ in which:
x=input
f(x)=output
0=start of input range
A=start of target value region
B=end of target value region
C=end of input range
a=slope in regions outside the target value region
b=slope in the target value region.

In FIG. 3, the target value region 58 comprises the region of the measurement span indicia in FIG. 1 that is between the horizontal lines 34 and 36; and regions 57 and 59 comprise the regions of the measurement span indicia below and above the target value region, respectively.

As should be apparent, in a graphical indicator that operates in accordance with FIG. 3, an amount of change in the measured value of a parameter is represented by a greater amount of change in the position of the measured value indicia when the measured value indicia is in the target value region 58 than when the measured value indicia is in regions 57 or 59. Accordingly, the graphical indicator has an increased sensitivity in the target value region, which is close to the target value indicia as shown in FIG. 1. In the embodiment of FIG. 3, also, the increased sensitivity in the target value region is provided while still allowing the graphical indicator to represent a large span of measured values.

In a graphical indicator operating as illustrated in FIG. 3, each of the three regions 57, 58 and 59 is linear in that an amount of a change in the measured value of a parameter is represented by a corresponding amount of movement of the measurement value indicia in each region. However, the linear relationship in the target value region is different than the linear relationship in regions 57 and 59.

A graphical indicator operating as illustrated in FIG. 3, provides sudden changes in sensitivity at the start and end of the target value region, i.e., at locations A and B in FIG. 3. A graphical indicator driven by this manner of operation, therefore, may appear jumpy around the points where the sensitivity suddenly changes.

Figure 4:
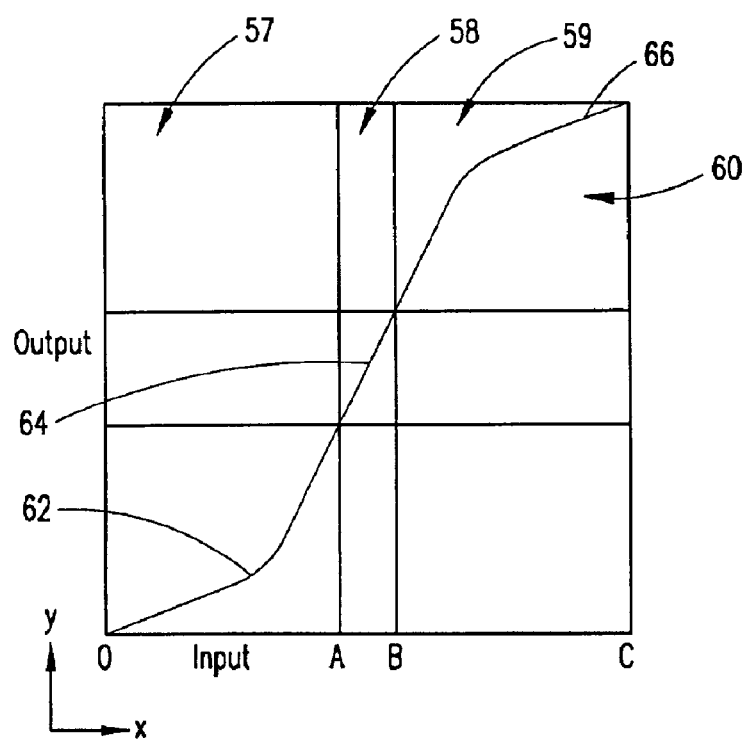
FIG. 4 is a graph that schematically illustrates the operation of a graphical indicator according to a further embodiment of the present invention.

An alternative approach is to cause the sensitivity of the graphical indicator to change smoothly from one region to another, and FIG. 4 is a graph that illustrates the operation of a graphical indicator according to such an approach.

In FIG. 4, the relationship between the Input and Output is represented by line 60 that includes line portions 62, 64 and 66 in regions 57, 58 and 59, respectively. The primary difference between the implementation of FIG. 4 and the implementation of FIG. 3 is the relationship between the Input and Output in the regions 57 and 59, represented by line portions 62 and 66, respectively. In the target value region 58, the relationship between the Input and Output, represented by line portion 64, is the same as in the implementation of FIG. 3.

Figure 5:
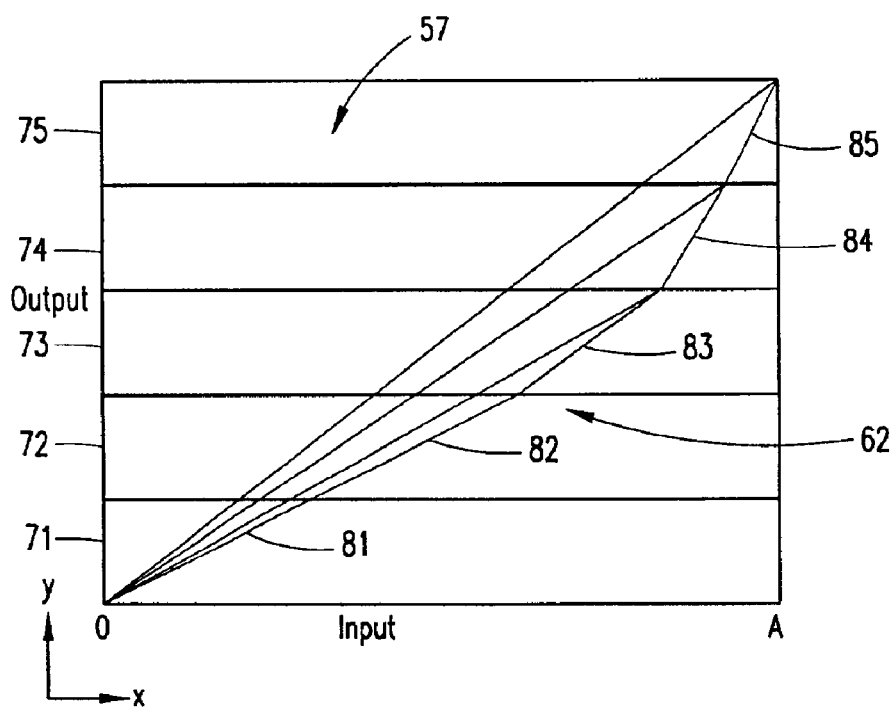
FIG. 5 is a graph that illustrates a portion of the graph of FIG. 4 in greater detail.

FIG. 5 is a graph that illustrates the lower part of region 57; i.e., the part of region 57 that includes line portion 62, to illustrate line portion 62 in greater detail to assist in explaining the operation of a graphical indicator operating in accordance with the embodiment illustrated in FIG. 4. In this regard, it should be observed that line portion 66 in region 59 of the measurement span is simply a mirror reflection of line portion 62. Line portion 66 can thus be represented through a simple transposition of the relationship between the Input and Output in region 57 that will be described below; and, accordingly, need not be separately described herein.

As shown in FIG. 5, the lower part of region 57 is divided into a plurality of equally-spaced segments 71–75 along the output axis to, in turn, divide the line portion 62 into a plurality of line segments 81–85. Although, in the embodiment illustrated in FIG. 5, the part is divided into five segments, this is intended to be exemplary only as the part could be divided into a greater or lesser number of segments if desired. In FIG. 5, the relationship between Input and Output is derived on a left-to-right basis.

Each line segment 81–85 is defined to have a slope that is the average of the previous slope and the slope of a hypothetical line that is drawn between the origin at point 0 and the previous segment. Each section is also defined to have a Y-intercept to ensure that the segment is continuous with the previous segment. The last section 85 is the exception to this formula as it has a slope that is guaranteed to meet the origin.

For each of the five segments in FIG. 5:

The slope of the segment=(the slope of the previous segment+($Y$-Point)/($X$-Point)*½.

$Y$-Intercept of a segment=($Y$-Point)−(slope of segment*$X$-Point)

A segment can then be defined by:

Output=Slope of segment*Input+$Y$-Intercept of Segment

An example of the operation of a graphical indicator according to an embodiment of the present invention will now be described to facilitate a clear understanding of the invention. In the example, it is assumed that a user is in the process of tuning a resonator on a Bandpass filter. The parameter is thus frequency of the resonator. It is also assumed that the total span of frequency values represented by the measurement span indicia of the graphical indicator is 400 MHz; and, further, that the linear region within the measurement span indicia; i.e., the target value region 58 defined by lines 34 and 36 in FIG. 1, is 10 MHz and occupies 50% of the measurement span indicia. The target value region thus has a responsiveness of 50% per 10 MHz, or a 1% display change per 200 KHz change. This means that in order for the graphical indicator to be able to represent the entire span of parameter values, the non-linear regions; i.e., regions 57 and 59 must have an average responsiveness of 50% per 390 MHz, or a 1% display change per 7.8 MHz change.

In the example, the non-linear region 57 is split into five segments as illustrated in FIG. 5. Each segment, following the procedure outlined above, can be described by the following equations in which F(x) is a value between 0 and 100 percent that represents where the user will see a representation of the most recent measured value of the frequency. A value of 50% thus represents an Input value that is directly on the target frequency.

To simplify the equations, the value x is preferably shifted so that the measurement span represented by the measurement span indicia starts at a value of zero. To do this, the value x has been shifted so that x=Most Recent Value−(center frequency−total span/2). Therefore, when x=0, F(x) is set at 0 as well.

1. $F(x) = 2.956e-8 * x + 0$     for $0 \leq x < 169e6$
2. $F(x) = 3.807e-7 * x - 59.375$     for $169e6 < x < 182e6$
3. $F(x) = 7.065e-7 * x - 118.75$     for $182e6 < x < 189e6$
4. $F(x) = 1.333e-6 * x - 237.5$     for $189e6 < x < 193e6$
5. $F(x) = 2.564e-6 * x - 475$     for $193e6 < x \leq 195e6$ (In the equations, the symbol "e" followed by a number represents 10 to the power of that number, and the symbol "e" followed by a negative number represents 10 to the negative power of that number.)

The linear region is handled by the following equation, where $x$=Current Value−(Center Frequency−total linear span/2)

6. $F(x)=5e-6* x+25$ for $0<x<10e6$

Figures 6, 7:
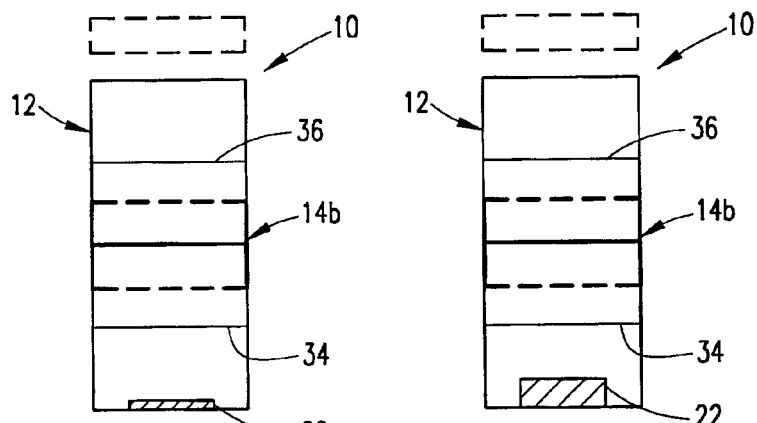
FIGS. 6–9 illustrate an example of a multi-step adjustment process utilizing a graphical indicator according to an embodiment of the present invention.

Assume that a graphical indicator representing a resonator has a target frequency value of 1 GHz, and the user is in the process of tuning the resonator. Assume also that the most recent measured value of the resonator is 850 MHz. After applying the shift, x becomes 50e6. This is within the span of equation (1) above. Using that equation, the display percentage of the measured value indicia 22 is 1.4% of the total measurement span indicia 12 such that the vertical bar of the measured value indicia 22 represents 1.4% of the total span of the measurement span indicia 12 as shown in FIG. 6.

The user, viewing this response, understands that the resonator needs to be tuned to a higher frequency. After a little tuning, the resonator has an adjusted measured value of 975 Mhz. At 975 Mhz, x becomes 175e6. Therefore, equation (2) is used giving a f(x) value of 7.25%. As shown in FIG. 7, therefore, the measured value indicia 22 represents 7.25% of the measurement span indicia 12.

The user now sees that the resonator needs to be tuned even higher. The user tunes the resonator to a value of 990

Figures 8, 9:
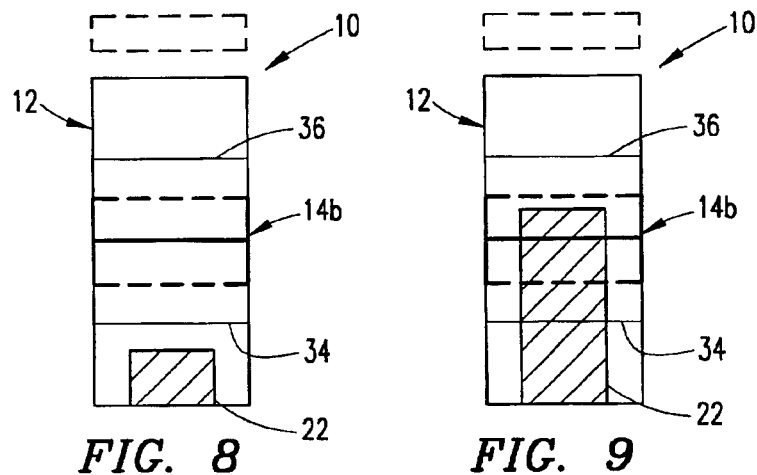

MHz. At 990 MHz, x becomes 190e6. Therefore, equation (4) is used to give f(x) a value of 15.7%; and, as shown in FIG. 8, the measured value indicia 22 represents 15.7% of the measurement span indicia 12.

The user now recognizes the increased sensitivity of the graphical indicator 10, and tunes the resonator just slightly higher. The resonator is measured to be at 1.002 GHz. This is within the linear region 58, so x=7.2e6, giving f(x) a value of 61%. The measured value indicia 22 thus represents 61% of the measurement span indicia 12.

At this point, the resonator is tuned to a value within the target range 14b; and the user has completed the tuning process using the graphical indicator.

While what has been described, constitutes exemplary embodiments of the invention, it should be recognized that the invention can be varied in numerous ways without departing from the scope thereof. Accordingly, it should be understood that the invention should be limited only insofar as is required by the scope of the following claims.

We claim:

1. A graphical indicator for adjusting a value of a parameter to a target value comprising:

target value indicia that represents a target value of the parameter; and measured value indicia that represents a measured value of the parameter, wherein a change in a measured value of said parameter relative to said target value is represented by a first corresponding amount of movement of the measured value indicia relative to the target value indicia when said measured value is within a first span of parameter values, and a second corresponding amount of movement of the measured value indicia relative to the target value indicia when said measured value is within a second span of parameter values, wherein said first span of parameter values is closer to said target value indicia than said second span of parameter values, and said first corresponding amount of movement is greater than said second corresponding amount of movement.

2. The graphical indicator according to claim 1, wherein said target value indicia is located the center of said first span of parameter values.

3. A graphical indicator for adjusting a value of a parameter to a target value comprising:

target value indicia that represents a target value of the parameter; and measured value indicia that represents a measured value of the parameter, wherein a change in a measured value of said parameter relative to said target value is represented by a first corresponding amount of movement of the measured value indicia relative to the target value indicia when said measured value is within a first span of parameter values, and a second corresponding amount of movement of the measured value indicia relative to the target value indicia when said measured value is within a second span of parameter values, the second corresponding amount of movement being different than the first corresponding amount of movement, and wherein said graphical indicator further includes measurement span indicia that represents a span of parameter values capable of being represented by the graphical indicator, and wherein said measurement span indicia includes a first measurement span indicia portion in which an amount of change in the measured value of said parameter relative to said target value is represented by said first corresponding amount of movement, and a second measurement span indicia portion in which the amount of change in the measured value of said parameter relative to said target value is represented by said second corresponding amount of movement.

4. The graphical indicator according to claim 3, wherein said first corresponding amount of movement is greater than said second corresponding amount of movement.

5. The graphical indicator according to claim 4, wherein said first measurement span indicia portion is closer to said target value indicia than said second measurement span indicia portion.

6. The graphical indicator according to claim 5, wherein said first measurement span indicia portion comprises linear measurement span indicia portion in which the first corresponding amount of movement is the same throughout the first measurement span indicia portion, and said second measurement span indicia portion comprises a non-linear measurement span indicia portion in which the second corresponding amount of movement differs at different locations in the second measurement span indicia portion.

7. The graphical indicator according to claim 6, wherein said non-linear measurement span indicia portion comprises a plurality of segments, and wherein the second corresponding amount of movement comprises a different second corresponding amount of movement in each segment.

8. The graphical indicator according to claim 7, wherein the second corresponding amount of movement in said segments decreases as a function of the extent to which a span of measured parameter values represented by a segment is farther from the target value.

9. The graphical indicator according to claim 3, wherein said target value indicia is located in the center of said first measurement span indicia portion.

10. The graphical indicator according to claim 3, wherein said measurement span indicia comprises a rectangular-shaped area on a display, and wherein said target value indicia comprises at least one of line representing a discrete target value or a region representing a range of acceptable target values.

11. The graphical indicator according to claim 3, and further including boundary demarcation indicia to separate the first measurement span indicia portion and the second measurement span indicia portion.

12. The graphical indicator according to claim 11, wherein said boundary demarcation indicia comprises lines in said measurement span indicia.

13. The graphical indicator according to claim 3, wherein said measurement span indicia includes a measurement span indicia section representing parameter values less than said target value, and a measurement span indicia section representing parameter values more than said target value.

14. The graphical indicator according to claim 3, and further including a legend for providing information regarding the graphical indicator.

15. A graphical indicator for adjusting a value of a parameter to a target value comprising:

measurement span indicia that represents a span of parameter values capable of being represented by the graphical indicator;

target value indicia that represents the target value of the parameter;

measured value indicia that represents a measured value of the parameter, wherein an amount of change in the measured value of the parameter relative to the target value of the parameter is represented by a corresponding amount of movement of the measured value indicia relative to the target value indicia; and indicia for dividing the measurement span indicia into linear measurement span indicia portion in which the amount of change in the measured value of the parameter is represented by the same corresponding first amount of movement of the measured value indicia throughout the linear measurement span indicia portion, and a non-linear measurement span indicia portion in which the amount of change in the measured value of the parameter is represented by different corresponding second amounts of movement of the measured value indicia in different portions of the non-linear measurement span indicia portion.

16. The graphical indicator according to claim 15, wherein said linear measurement span indicia portion is closer to said target value indicia than said non-linear measurement span indicia portion.

17. The graphical indicator according to claim 16, wherein said corresponding first amount of movement of said measured value indicia is larger than said corresponding second amounts of movement.

18. The graphical indicator according to claim 17, wherein said corresponding second amounts of movement decrease as a function of the amount by which said measured value indicia differs from said target value indicia.

19. The graphical indicator according to claim 15, wherein said measurement span indicia includes a measurement span indicia section representing parameter values less than said target value, and a measurement span indicia section representing parameter values more than said target value.

20. The graphical indicator according to claim 19, wherein said target value indicia is located in the center of said linear measurement span indicia portion.

21. The graphical indicator according to claim 15, wherein said target value indicia comprises at least one of a line representing a discrete target value or a region representing a range of acceptable target values.

22. A graphical indicator for adjusting a value of a parameter to a target value comprising:

target value indicia that represents a target value of the parameter; and measured value indicia that represents a measured value of the parameter, wherein a change in a measured value of said parameter relative to said target value is represented by a corresponding amount of movement of the measured value indicia relative to said target value indicia, and wherein the sensitivity of the amount of movement of the measured value indicia relative to the target value indicia changes as a function of the proximity of the measured value of the parameter relative to said target value of the parameter.

23. The graphical indicator according to claim 22, wherein said sensitivity increases as the measured value of the parameter is closer to said target value.

24. A graphical indicator for adjusting a value of a parameter to a target value comprising;

target value indicia that represents a target value of the parameter; and measured value indicia that represents a measured value of the parameter, wherein said graphical indicator further includes a region of increased sensitivity in which a change in a measured value of said parameter relative to said target value is represented by a corresponding amount of movement of the measured value indicia relative to the target value indicia that is greater than a corresponding amount of movement of the measured value indicia relative to the target value indicia when target value indicia is outside the region of increased sensitivity.

25. The graphical indicator according to claim 24, wherein said target value indicia is settable by a user to different values, and wherein said region of increased sensitivity moves on said graphical display when said target value indicia is set to a different value.

26. The graphical indicator according to claim 25 wherein said target value indicia is in the center of said region of increased sensitivity.

\* \* \* \* \*

UNITED STATES PATENT AND TRADEMARK OFFICE
CERTIFICATE OF CORRECTION

PATENT NO. : 6,952,209 B2  Page 1 of 1
DATED : October 4, 2005
INVENTOR(S) : Ericsson et al.

It is certified that error appears in the above-identified patent and that said Letters Patent is hereby corrected as shown below:

Column 9,
Line 41, after "located" insert -- in --.

Column 10,
Line 15, after "comprises" insert -- a --.
Line 39, after "one of" insert -- a --.

Column 11,
Line 4, after "into" insert -- a --.

Column 12,
Line 19, after "comprising" delete ";" and insert -- : --.
Line 30, after "when" insert -- said --.
Line 38, after "claim 25" insert -- , --.

Signed and Sealed this

Fourth Day of April, 2006

JON W. DUDAS
*Director of the United States Patent and Trademark Office*